United States Patent [19]

Bartholomew

[11] Patent Number: 5,195,787
[45] Date of Patent: Mar. 23, 1993

[54] QUICK CONNECTOR WITH HEAVY-DUTY RETAINER

[75] Inventor: Donald D. Bartholomew, Mt. Clemens, Mich.

[73] Assignee: Proprietary Technology, Inc., Southfield, Mich.

[21] Appl. No.: 623,763

[22] Filed: Dec. 7, 1990

Related U.S. Application Data

[63] Continuation-in-part of Ser. No. 465,773, Jan. 16, 1990, abandoned.

[51] Int. Cl.$^5$ ............................................. F16L 37/00
[52] U.S. Cl. ..................................... 285/319; 285/317; 285/320; 285/340; 285/921
[58] Field of Search ............... 285/319, 921, 317, 340, 285/320

[56] References Cited

U.S. PATENT DOCUMENTS

| | | |
|---|---|---|
| 730,378 | 6/1903 | Lambert . |
| 921,691 | 5/1909 | Friday . |
| 1,542,421 | 6/1925 | Strongson . |
| 1,837,345 | 12/1931 | Thomas . |
| 1,976,589 | 10/1934 | Trickey . |
| 2,123,889 | 7/1938 | Gleason . |
| 2,441,344 | 5/1948 | Bosworth . |
| 2,585,887 | 2/1952 | Woodward . |
| 3,314,696 | 4/1967 | Ferguson et al. . |
| 3,450,424 | 6/1969 | Calisher . |
| 3,453,005 | 7/1969 | Foults . |
| 3,527,485 | 9/1970 | Goward et al. . |
| 3,534,988 | 10/1970 | Lindsey . |
| 3,538,940 | 11/1970 | Graham . |
| 3,569,903 | 3/1971 | Brishka . |
| 3,574,359 | 4/1971 | Klein . |
| 3,584,902 | 6/1971 | Vyse . |
| 3,628,768 | 12/1971 | Hutt . |
| 3,711,125 | 1/1973 | Dehar . |
| 3,718,350 | 2/1973 | Klein . |
| 3,724,882 | 4/1973 | Dehar . |
| 3,780,773 | 12/1973 | Haugen . |
| 3,826,523 | 7/1974 | Eschbaugh . |
| 3,929,356 | 12/1975 | DeVincent et al. . |
| 3,929,357 | 12/1975 | DeVincent et al. . |
| 3,933,378 | 1/1976 | Sandford et al. . |
| 3,980,324 | 9/1976 | Bouteille et al. . |
| 4,005,883 | 2/1977 | Guest . |
| 4,009,896 | 3/1977 | Brewer . |
| 4,080,752 | 3/1978 | Burge . |
| 4,111,464 | 9/1978 | Asano et al. . |
| 4,123,089 | 10/1978 | Viero et al. . |
| 4,123,091 | 10/1978 | Cosentino et al. . |
| 4,128,264 | 12/1978 | Oldford . |
| 4,135,745 | 1/1979 | Dehar . |
| 4,136,885 | 1/1979 | Uhrner . |
| 4,158,407 | 6/1979 | Rest . |
| 4,214,586 | 7/1980 | Mericle . |
| 4,219,222 | 8/1980 | Brusadin . |
| 4,244,608 | 1/1981 | Stuemky . |
| 4,266,814 | 5/1981 | Gallagher . |
| 4,423,892 | 1/1984 | Bartholomew . |
| 4,483,371 | 11/1984 | Susin . |
| 4,483,543 | 11/1984 | Fisher, Jr. et al. . |
| 4,524,995 | 6/1985 | Bartholomew . |
| 4,601,497 | 7/1986 | Bartholomew . |
| 4,681,350 | 7/1987 | Gaita ........................ 285/319 X |
| 4,681,351 | 7/1987 | Bartholomew . |
| 4,753,458 | 6/1988 | Case et al. ................ 285/921 X |
| 4,846,506 | 7/1989 | Boscon et al. ............ 285/921 X |

(List continued on next page.)

Primary Examiner—Randolph A. Reese
Assistant Examiner—Timothy Aberle
Attorney, Agent, or Firm—Harness, Dickey & Pierce

[57] ABSTRACT

A conduit assembly has a retainer with a pair of retaining elements. The first of the retainers maintains a seal in the housing assembly. The second retainer retains the conduit in the housing. One of the retainers has arms with an overall U-shape including at one end, one of the arms being coupled with its ring and at the other end, the arm includes a mechanism for abutting the annular bead to retain the conduit in the housing. The arms include an insert which may be of different material to retain the conduit within the housing.

8 Claims, 6 Drawing Sheets

U.S. PATENT DOCUMENTS

| | | | |
|---|---|---|---|
| 4,913,467 | 8/1990 | Washizu | 285/319 X |
| 4,915,136 | 4/1990 | Bartholomew . | |
| 4,915,420 | 4/1990 | Washizu | 285/319 X |
| 4,925,217 | 5/1990 | Ketcham | 285/319 X |
| 4,936,544 | 6/1990 | Bartholomew . | |
| 4,944,536 | 8/1990 | Bartholomew | 285/319 |
| 4,944,537 | 7/1990 | Usui | 285/319 |
| 4,946,205 | 8/1990 | Washizu | 285/319 |
| 4,948,175 | 8/1990 | Bartholomew . | |
| 4,948,176 | 8/1990 | Bartholomew | 285/921 X |
| 4,981,586 | 1/1991 | Bartholomew . | |

FOREIGN PATENT DOCUMENTS

| | | |
|---|---|---|
| 163947 | 9/1949 | Austria . |
| 2360921 | 6/1974 | Fed. Rep. of Germany . |
| 2307154 | 8/1974 | Fed. Rep. of Germany . |
| 2611233 | 9/1977 | Fed. Rep. of Germany . |
| 2622269 | 11/1977 | Fed. Rep. of Germany . |
| 881439 | 7/1980 | U.S.S.R. . |
| 634848 | 3/1950 | United Kingdom . |
| 693094 | 6/1953 | United Kingdom . |
| 718350 | 11/1954 | United Kingdom . |
| 781554 | 8/1957 | United Kingdom . |
| 791247 | 2/1958 | United Kingdom . |
| 1030535 | 5/1966 | United Kingdom . |
| 1145667 | 3/1969 | United Kingdom . |
| 1172348 | 11/1969 | United Kingdom . |
| 1343665 | 1/1974 | United Kingdom . |
| 1350546 | 4/1974 | United Kingdom . |
| 2011002 | 7/1979 | United Kingdom . |
| 2014115 | 8/1979 | United Kingdom . |

QUICK CONNECTOR WITH HEAVY-DUTY RETAINER

CROSS REFERENCE TO A RELATED APPLICATION

This application is a continuation-in-part of application Ser. No. 465,773, filed Jan. 16, 1990 (now abandoned).

BACKGROUND AND SUMMARY OF THE INVENTION

The present invention relates to a connector assembly which utilizes a heavy-duty horseshoe-shaped retainer.

In the automotive industry, as well as many other industries, there is a great need for low cost, reliable and easy to assemble components. This need is especially apparent with respect to providing a connection between fluid-carrying conduits, such as fuel or refrigerant lines. In older threaded connectors, substantial assembly time could be accumulated in screwing on a cap to a fitting and tightening the cap down to the proper torque needed to provide a fluid-tight seal. Further, an inventory would have to be maintained to keep track of the number of caps and fittings, and any liners or other components that may be necessary. Also, retightening of the caps may be required to maintain the seal after the automobile or other system has been put in use.

A version of a horseshoe-type retainer used in conjunction with female connector housings and beaded male tubes, where the retainer transfers separation forces from the male tube bead to the female housing is illustrated in U.S. Pat. No. 4,423,892 issued to Bartholomew.

The retainer of the present invention differs from previous connectors utilizing horseshoe-type retainers in that the retainer is totally enclosed in the female housing bore abutting a wall that is part of a reduced diameter portion of the female housing bore. The mating male end passes through the retainer which is contained in the first diameter portion of said female housing, through a reduced second diameter portion of the female housing and into a further reduced third portion of the female that centers the male in the female and contains the sealing means which provides for a fluid-tight seal. Thus, the retainer receives separation forces between the male and female by means of an abutting wall which is attached to or is formed on the male tubular conduit. The abutting surface may be either a surface that extends from the outer diameter of the male tubular end portion or a groove in the tubular surface of the male mating portion.

It is desirable to mount the retainer in the female so that the abutting portion of the retainer that cooperates with the male abutting portion is at the center axis of the female bore. It is also desirable to provide the retainer with means that allows a retainer to be easily installed within the female bore where the retainer is installed prior to inserting the male tubular conduit or where the retainer is first mounted on the male tubular conduit and then inserted into the female bore.

It is also desired in the case where the retainer is preinstalled in the female to have the retainer formed such that it is spread open by the male upon insertion. The retainer accommodates tolerances of the male and permits movement of the male without seriously affecting the abutting function.

Accordingly, it is an object of the present invention to provide an improved connector assembly which utilizes a heavy-duty horseshoe-shaped retainer for providing a quick connection between fluid conveying conduits.

Another object of the present invention is to provide a preassembled connector housing and retainer element so that a connection to a tubular fluid conveying conduit may be made in one step without resorting to any tools.

Another object of the present invention is to provide a connector assembly that may be employed to join dissimilar electrically conducting materials that would be otherwise subject to galvanic corrosion.

From the following detailed description taken in conjunction with the accompanying drawings and subjoined claims, other objects and advantages of the present invention will become apparent to those skilled in the art.

DETAILED DESCRIPTION OF THE PREFERRED EMBODIMENT

Figure 1:
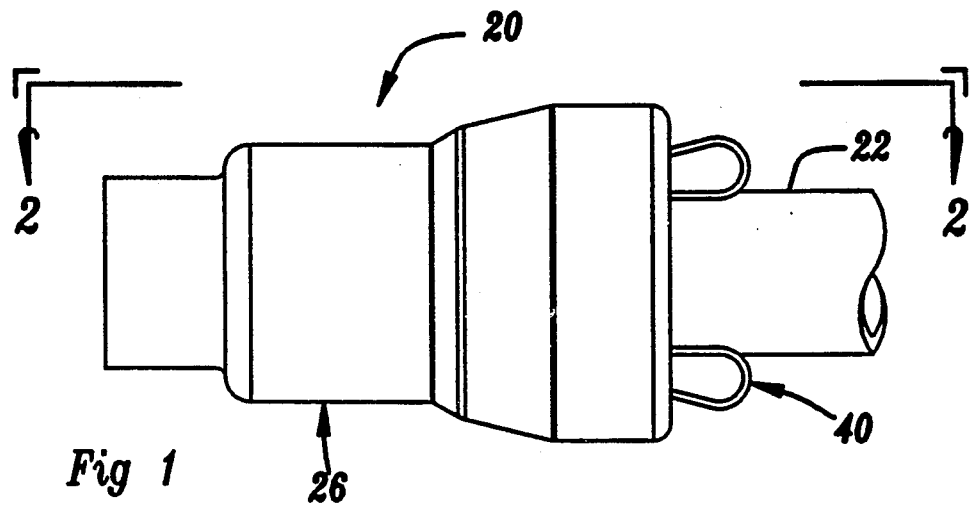
FIG. 1 is an elevation view of the connector assembly in accordance with the present invention.
Figure 2:
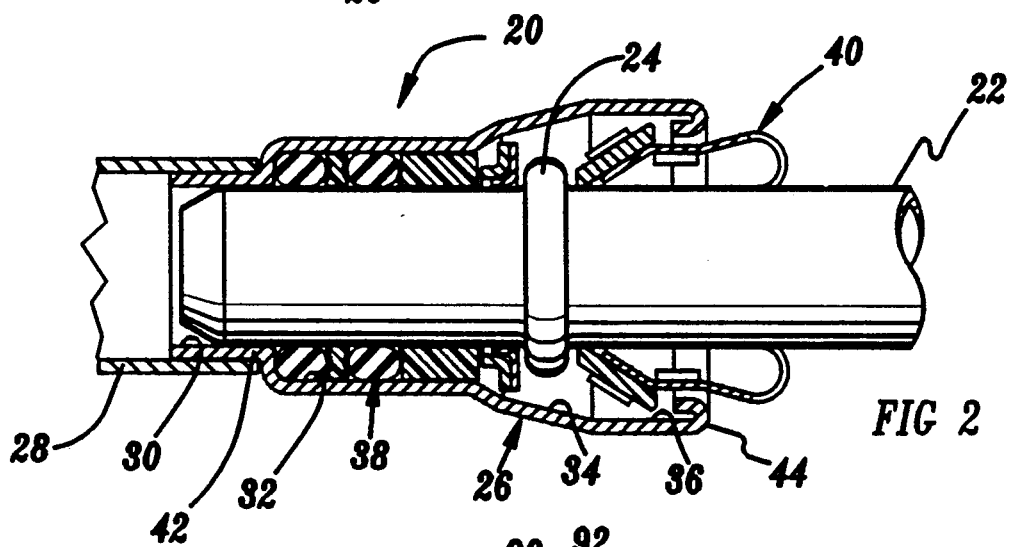
FIG. 2 is a sectional view through Line 2—2 of FIG. 1.
Figure 3:
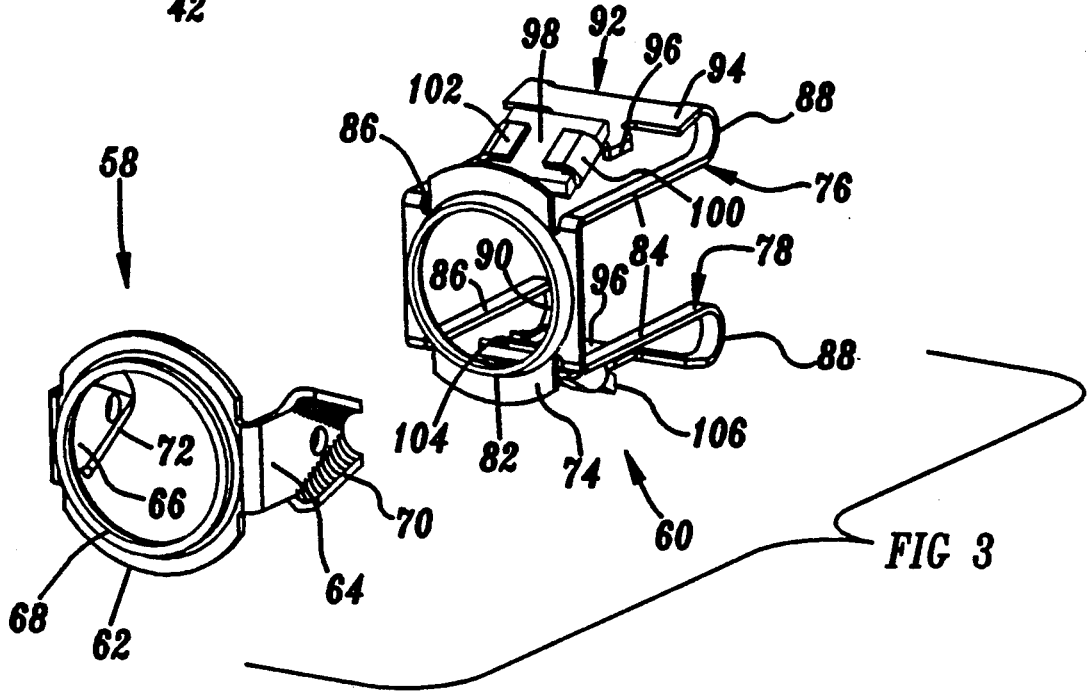
FIG. 3 is a perspective view of a retainer in accordance with the present invention.

Turning to the figures, particularly FIGS. 1 and 2, a quick connector assembly is illustrated and designated with the reference numeral 20. The quick connector assembly includes a conduit 22 having an outward extending radial annular flange 24, positioned at a predetermined distance from the end of the conduit 22, a female housing 26 to receive the male conduit 22, and a conduit 28 coupled with the female housing 26.

Turning to FIG. 2, the female housing 26 is illustrated in section. The housing 26 includes an axial bore 30 passing through the housing 26. The axial bore 30 includes increased diameter portions 32, 34 and 36. The increased diameter portions 32, 34 and 36 provide housing of the sealing means 38 and the retainer mechanism 40. Also, the housing 26 includes, at one of its ends, a stem 42 which inserts into the conduit 28 and, at the other end, a radially inward turn flange 44 which coacts with the retainer mechanism 40 to retain the conduit 22 within the female housing 26.

The sealing means 38 generally includes a pair of elastomeric O-rings 50 and 52 separated by a washer 54. The O-rings 50 and 52 and washer 54 are retained in the increased diameter bore portion 32 by a bushing 56. The O-rings 50 and 52 seal the tip of the conduit 22 within the housing 26.

The retaining mechanism 40 includes a pair of retainer members 58 and 60. Retaining member 58 includes an annular ring portion 62 and a pair of extending arms 64 and 66. The ring 62 is generally flat and planar having a radially extending flange 68 extending from one side of the ring 62 which abuts the bushing 56 to maintain the bushing 56 in position in increased axial bore portion 32. The arms 64 and 66 extend from the other side of the ring 62 and have outward turned flanges 70 and 72 at their free extending ends. The flanges 70 and 72 angularly extend from the substantially planar arms 64 and 66 to contact with the flange 44 to maintain the retaining member 58 within the housing 26. Thus, retainer 58 is maintained in position within housing 26 which, in turn, maintains sealing means 38 within the housing 26.

Figure 4:
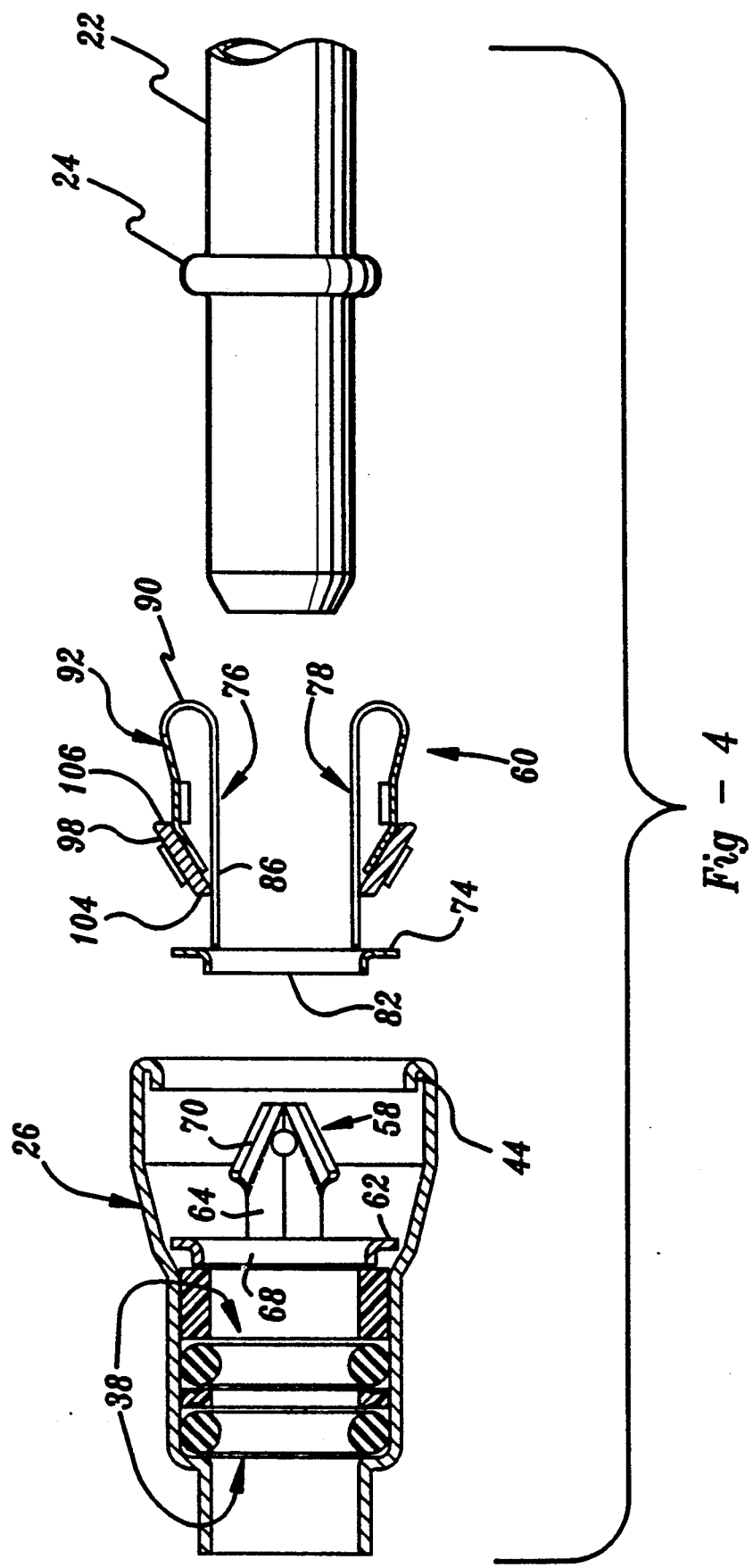
FIG. 4 is an exploded elevation view partially in section like that of FIG. 2.
Figure 5:
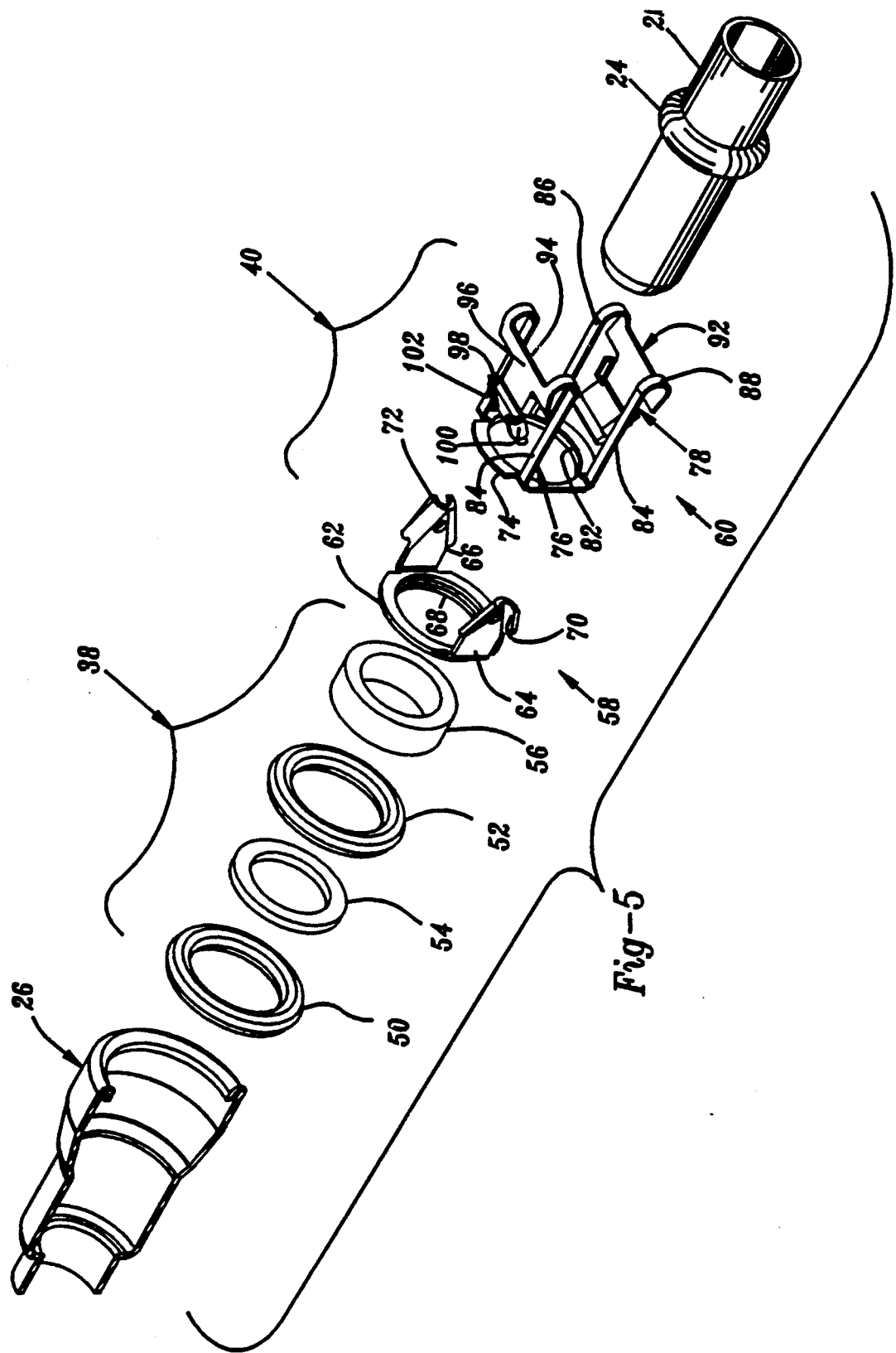
FIG. 5 is an exploded perspective view partially in section of the assembly of FIG. 2.

Retaining member 60 includes a ring portion 74 and a pair of arms 76 and 78. The ring portion 74 is substantially flat and planar and generally includes a radial flange 82 extending from one of its sides. The arms 76 and 78 extend substantially perpendicular from the ring 74 from its other side as seen in FIG. 4. The arms 76 and 78 have substantially identical configurations and have an overall U-shape. One leg of the "U" is formed from a pair of extending strips 84 and 86. Continuous with the strips 84 and 86 are arcuate or curved web portions 88 and 90 which are also continuous with the(other leg portion 92 of the U. The leg portion 92 has an overall "T" shape with its cross member 94 connecting with the curved webs 88 and 90 and its body portion 96 including a conduit securement insert 98. The body portion 96 generally includes fingers 100 and 102 which secure the conduit retaining insert 98 on the body 96.

The conduit retaining insert 98 has an overall rectangular shape with a leading edge 104 which acts as an abutting surface to abut the annular bead 24 of the conduit once the conduit is inserted into the housing 26. The insert 98 includes a trailing edge 106 which abuts the flange 44 to maintain the retainer 60 within the housing 26. The insert 98 may be manufactured from a metal, plastic or the like material to provide the desired characteristics needed by the particular conduit assembly. Also, the insert 98 could be manufactured from a heavier gage or a stronger metallic material than the retainer ring 74 and arms 76 and 78. Thus, a light weight ring and arms may be used with an insert which may be subjected to forces much greater than the material of the retainer ring 74 and arms 76 and 78.

The retainer arm 76 and 78 may have the web portions 88 and 90 extending out of the housing 26 as illustrated in FIG. 2. This enables the retainer 60, via pinching together arm 76 and 78, to be removed from the housing. Thus, retainers having different inserts could be utilized in the same housing.

Figure 6:
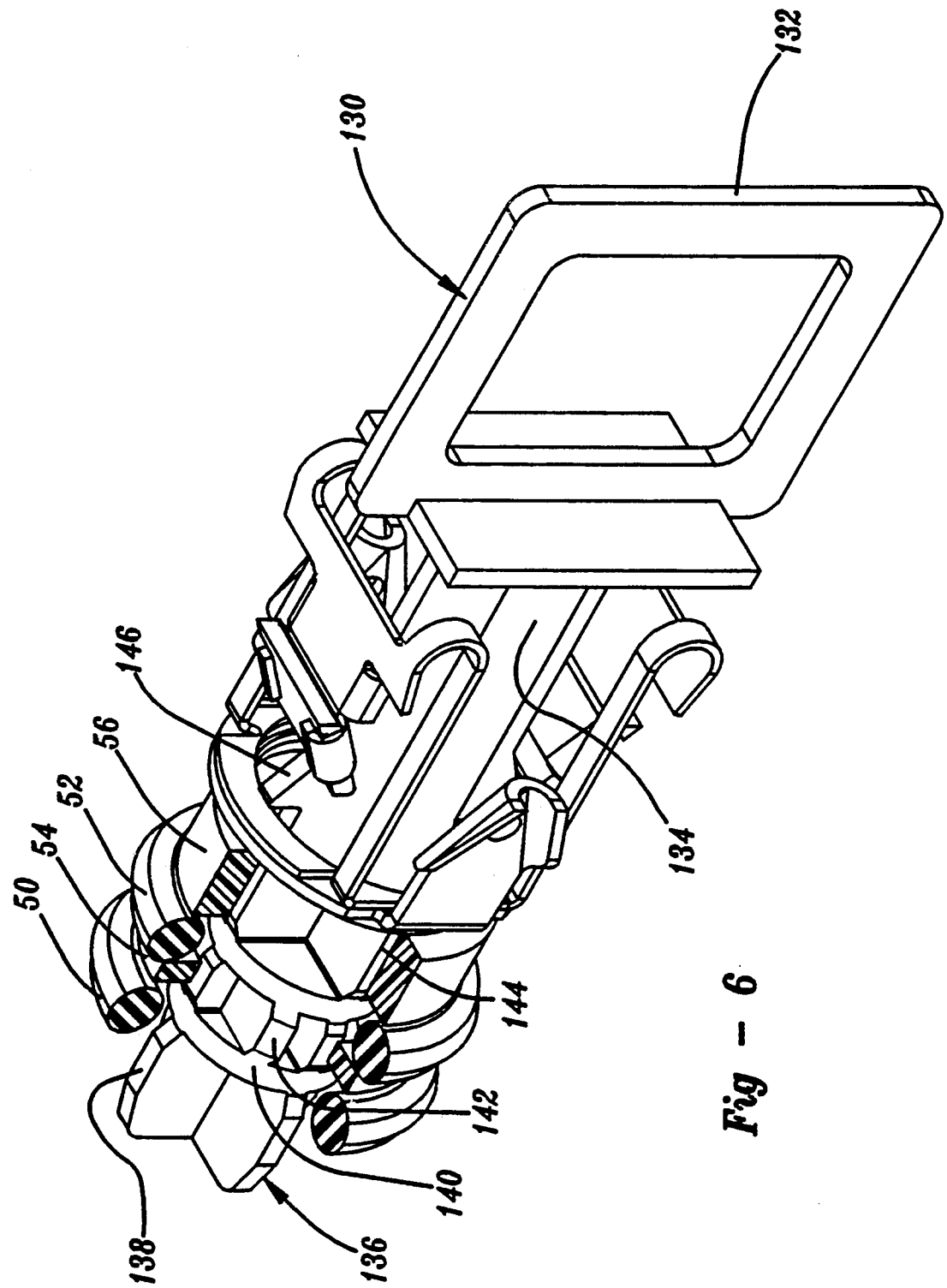
FIG. 6 is a perspective view of a retainer assembly and fitting for inserting the retainer and sealing means into the conduit housing.

Turning to FIG. 6, an apparatus is illustrated for inserting sealing means 38 and the retaining mechanism 40 into the female housing 26. The apparatus 130 includes a handle 132 and an elongated body 134. The handle is generally of an open polygonal shape and the body generally has a cross shape in cross section, however, the body as well as the handle could be of any desired configuration. The body 134 has an end 136 having a plurality of seating surfaces 138, 140 and 142 for enabling positioning of the O-rings 50, 52, washer 54 and bushing 56 thereon. The body 134 also includes a pair of outward extending stops 144 which abut the ring 74 of the retainer 60. The stops 144 are positioned a desired distance from the end 136 of the body 134 to enable proper positioning of the sealing means 38 and retainer mechanism 40 into the female housing 26.

During insertion, the stops 144 are positioned in line with the inserts 98 so that the inserts abut the stops 144 to maintain the position of the apparatus 130 with respect to the retainer 40 and sealing means 38 as seen in FIG. 6. Once the apparatus 130 has been inserted into the housing 26, the apparatus 130 is rotated 90 degrees so that the stops 144 are no longer in line with the inserts 98. This being the case, the retainers 58 and 60 are locked within the housing 26, via flange 44, and apparatus 130 is withdrawn from the housing. As the apparatus 130 is withdrawn, flange rings of retainers 58 and 60 push against bushing 56, O-rings 50 and 52 and washer 54 to enable the end 136 of apparatus 130 to be withdrawn through the washer, O-rings and bushing.

Figure 7:
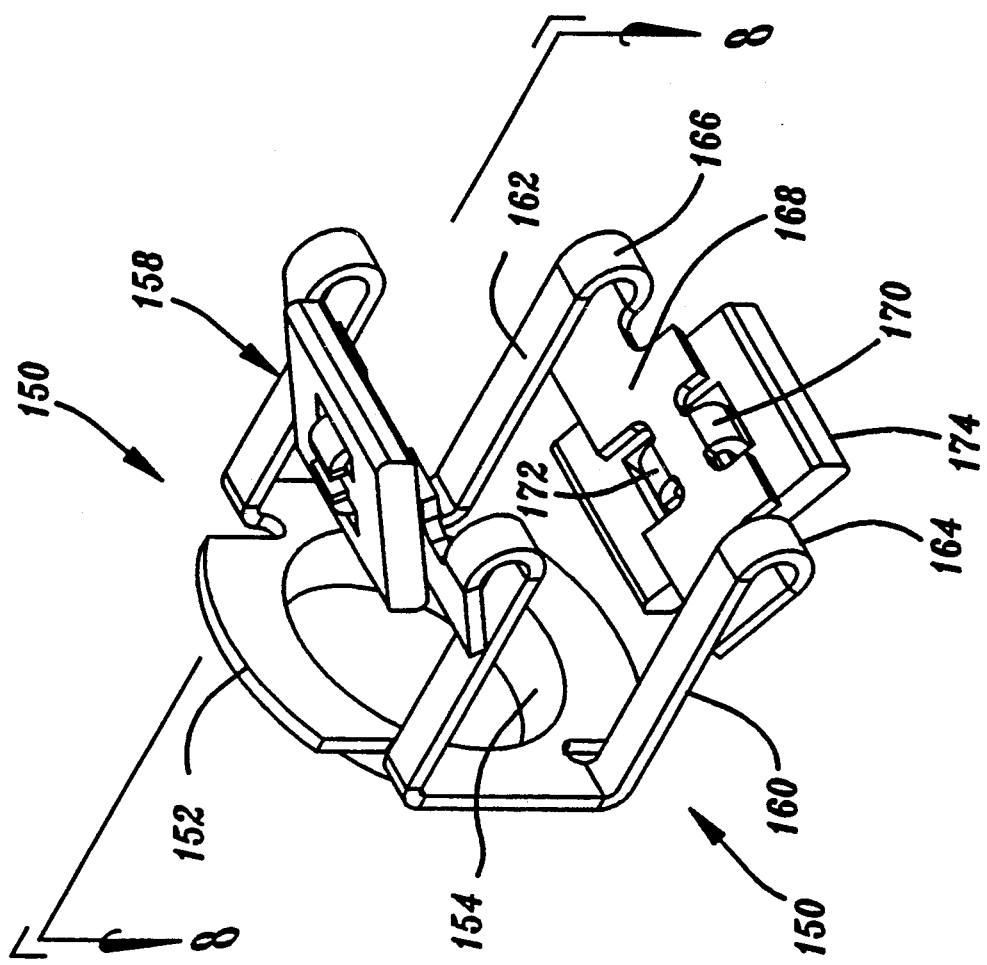
FIG. 7 is a perspective view of another embodiment of a retainer in accordance with the present invention.
Figure 8:
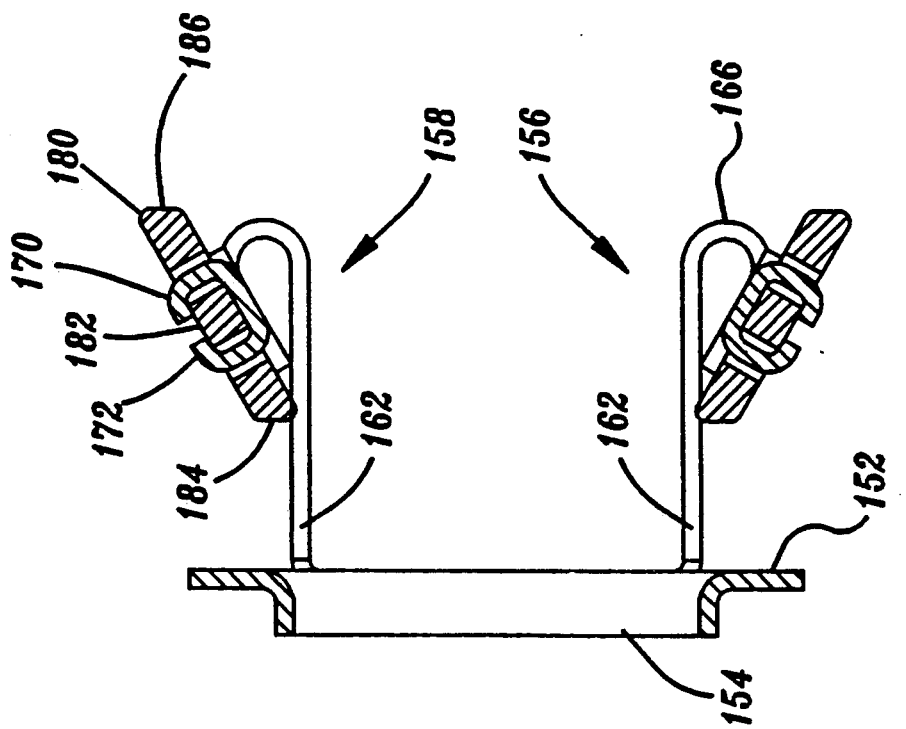
FIG. 8 is a sectional view along line 8—8 of FIG. 7.
Figure 9:
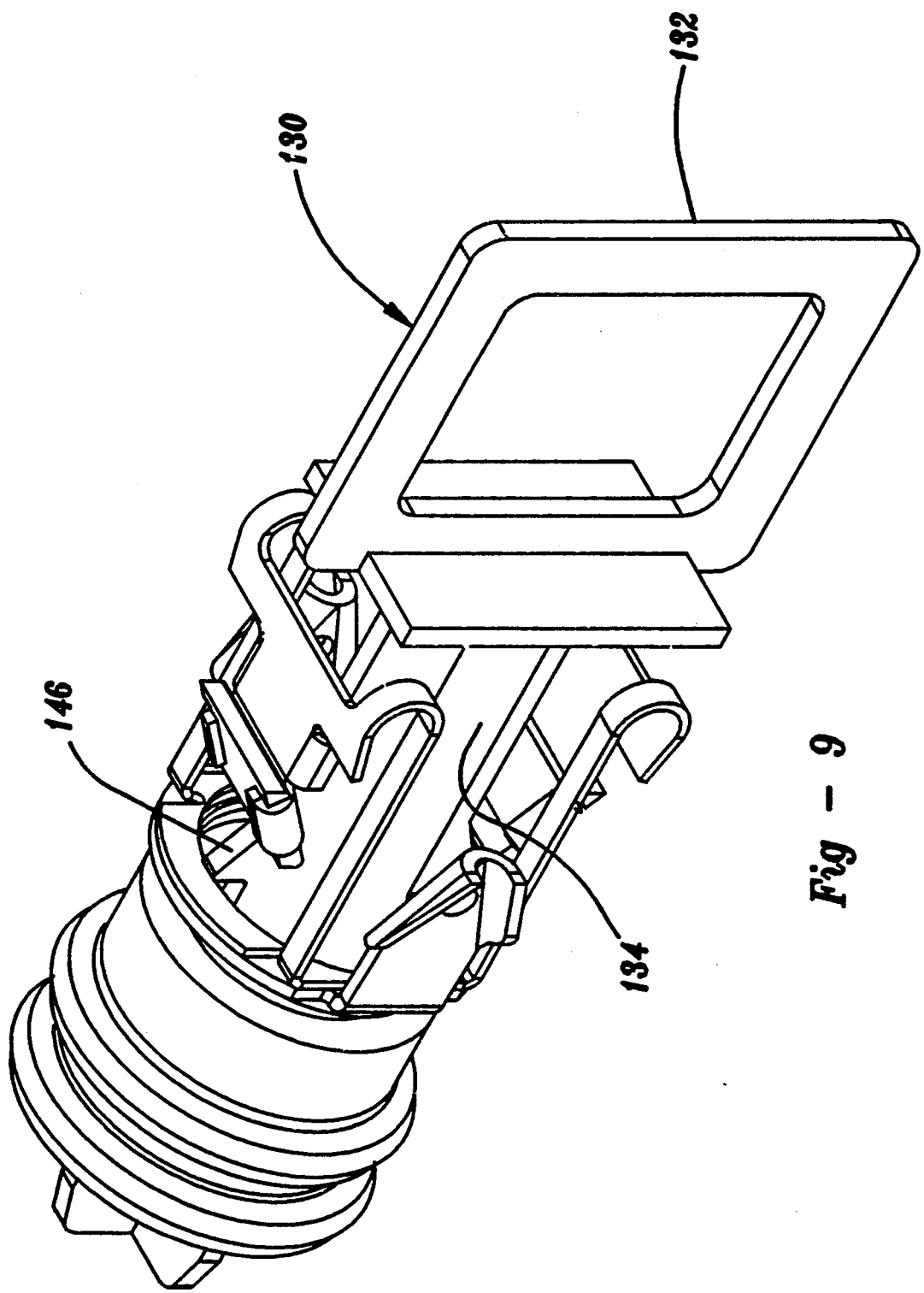
FIG. 9 is a perspective view of a retainer assembly like that of FIG. 6.

Moving to FIGS. 7 and 8, another embodiment of a retainer like that of retainer 60 is shown. Retainer 150 illustrated in FIGS. 7 and 8 is designed to be maintained within the housing 26 with its arms maintained within the housing 26.

The retainer 150 is substantially similar to retainer 60 having a ring portion 152 with flange 154 extending from one of its sides. Arms 156 and 158 extend from the other side of the ring portion 152. The arms 156 and 158 are substantially similar to arms 76 and 78 previously described. The arms 156 and 158 have an overall U-shape with a pair of elongated strips 160 and 162 forming a first leg with the strips 160 and 162 continuous with arcuate web portions 164 and 166 which, in turn, are continuous with cross member 168, which forms the second leg of the "U". The strips 160 and 162 forming one of the legs of the "U" are substantially longer than the cross member 168 forming the other leg of the "U".

Cross member 168 includes a pair of fingers 170 and 172 retaining a conduit retaining insert 180 onto the arms 156 and 158. The fingers 170 and 172 project into the middle of the insert 180 surrounding a bar 182 formed in the interior of the insert 180. The insert 180 also includes a front edge 184 and a trailing edge 186. The front edge 184 abuts the annular bead 24 of the conduit 22 to retain the conduit within the housing 26. Likewise, the trailing edge 186 abuts the flange 44 to retain the retainer 150 within the housing 26.

While the above detailed description describes the preferred embodiments of the present invention, it will be understood that the present invention is susceptible to modification, variation and alteration without deviating from the scope and fair meaning of the subjoined claims.

What is claimed is:

1. A quick connector assembly comprising:
   a conduit having a radially outward extending annular bead at a predetermined distance from an end of said conduit;
   a housing having an axial bore formed therein for receiving said conduit;
   seal means for sealing said conduit with said housing, said seal means positioned in said axial bore of said housing; and
   retainer means for retaining said conduit in said housing, said retainer means positioned in said housing axial bore, said retainer means including first and second retainers, said first retainer maintaining said sealing means in said housing and said second retainer for retaining said conduit in said housing, each of said first and second retainers including a ring means including an axial bore enabling passage of said conduit, a pair of arms extending from said ring means, said second retainer arms each having an overall U-shape with a first leg of each said second retainer arms coupled with said ring means and a second leg of each said second retainer arms including means for abutting said annular bead for retaining said conduit in said housing, and wherein said second leg is generally radially outwardly disposed of said first leg.

2. The quick connector assembly according to claim 1 wherein said retainer means further comprises a pair of retainers, a first of said retainer maintaining said sealing means in said housing and second retainer for including said conduit abutting means for maintaining said conduit in said housing.

3. The quick connector assembly according to claim 2 wherein said second retainer being removably secured within said housing.

4. The quick connector assembly according to claim 2 wherein said second retainer includes a ring portion and a pair of arms extending from said ring, said arms having an overall U-shape with one leg of the U formed by a pair of strips, the other leg having a T-shape and being joined by a pair of arcuate portions.

5. The quick connector assembly according to claim 4 wherein said T-shaped leg includes said conduit abutting means.

6. The quick connector assembly according to claim 5 wherein said conduit abutting means is disposed within a retaining means which depends from said second legs of said abutting means, said abutting means having an overall rectangular shape with a leading edge for abutting said annular bead to retain said conduit in said housing and a trailing edge abutting said housing for retaining said second retainer on said housing.

7. The quick connector assembly according to claim 6 wherein said insert is formed of a different material than said retainer.

8. A quick connector assembly comprising:
a conduit having a radially outward extending annular bead at a predetermined distance from an end of said conduit;
a housing having an axial bore formed therein for receiving said conduit;
seal means for sealing said conduit with said housing, said seal means positioned in said axial bore of said housing; and
retainer means for retaining said conduit in said housing, said retainer means positioned in said housing axial bore and including a ring means for maintaining said sealing means in said housing, said ring means including an axial bore enabling passage of said conduit, a pair of arms extending from said ring means, said arms having an overall U-shape with an end of one of said arms coupled with said ring means and an end of the other of said arms including means for abutting said annular bead for retaining said conduit in said housing, said abutting means being disposed within a retaining means which depends from said arms, said abutting means having an edge for abutting said annular bead and an edge for abutting said housing to retain said conduit in said housing.

* * * * *